(No Model.)

T. H. DUNHAM.
INSULATED ELECTRICAL CONDUCTOR.

No. 280,366. Patented July 3, 1883.

Witnesses.
G. B. Maynadier.
John R. Snow.

Inventor
Thomas H. Dunham
by J. E. Maynadier
his Atty.

UNITED STATES PATENT OFFICE.

THOMAS H. DUNHAM, OF BOSTON, MASSACHUSETTS.

INSULATED ELECTRICAL CONDUCTOR.

SPECIFICATION forming part of Letters Patent No. 280,366, dated July 3, 1883.

Application filed June 12, 1882. (No model.)

*To all whom it may concern:*

Be it known that I, THOMAS H. DUNHAM, of Boston, in the county of Suffolk and State of Massachusetts, have invented a new and useful Insulated Electrical Conductor, of which the following is a specification.

To make my new conductor a number of wires are laid parallel to each other between two laps of raw cotton saturated with tar, asphalt, or the like, the cotton laps being then compressed around the wires by suitable rollers. The tarred cotton lap provides a more perfect insulation, and its cost is much less than any covering heretofore used, so far as I know.

Figure 1:
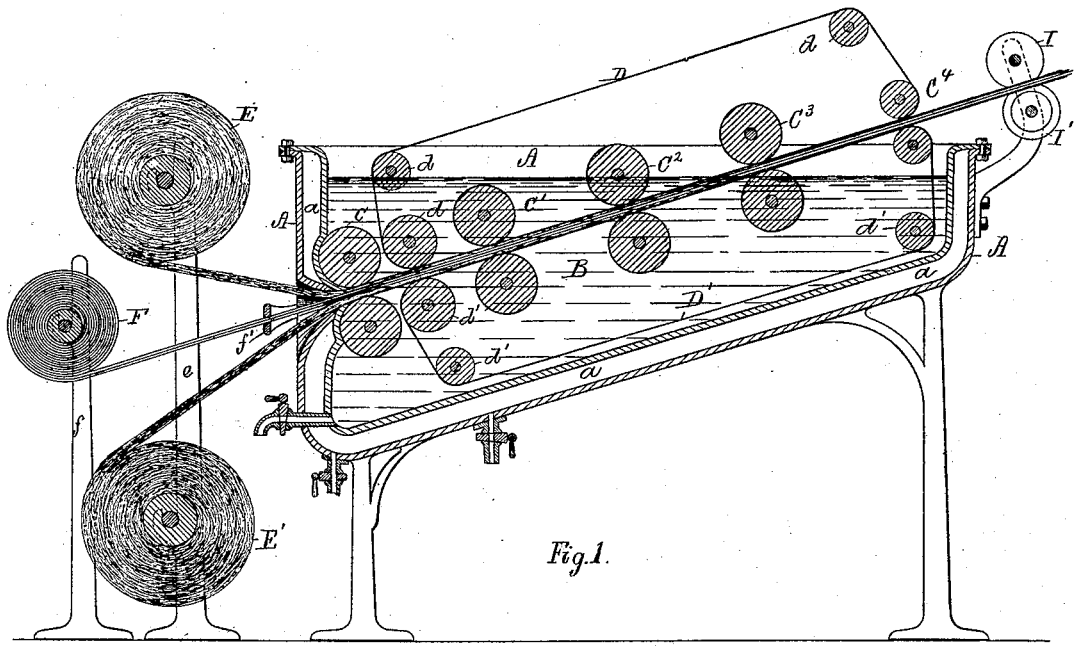
Figure 2:
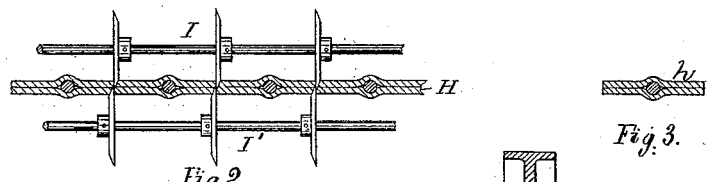
Figure 3:
Figure 4:
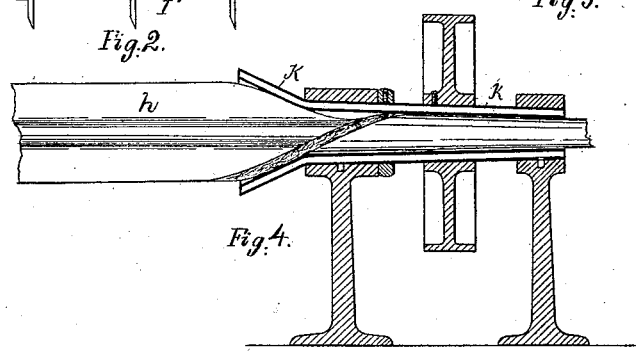
Figure 5:

In the accompanying drawings, which illustrate a machine for making my improved insulated conductor, Figure 1 is a side view, partly in section, of the whole machine. Fig. 2 is an end view of the wires incased in the laps, passing through the severing-rolls. Fig. 3 is a cross-section of one wire as severed from the rest. Fig. 4 shows the device for finishing the separate wires, and Fig. 5 is a cross-section of a finished conductor.

I do not confine myself to the particular machine shown in the drawings, as other devices for tarring the bats and inclosing the wires between them may be found equally efficient.

In the present machine a vat, A, is surrounded by a steam-jacket, $a$, which is kept full of steam to heat the tar, asphalt, or the like, B, with which the vat is kept filled to the required depth. A series of rollers, C C' C$^2$ C$^3$ C$^4$, are mounted in boxes secured to the side of the vat A. Two endless webs or aprons, D D', pass between these rollers and over the rollers $d\ d'$. The first pair of rollers, C, fit as closely as the nature of the liquid will allow about an opening in the end of the vat below the top of the liquid. A lap of raw cotton, E, wound on a reel is mounted on a stud, $e$, and a similar lap, E', is mounted lower down on the same stand. A reel containing a number of coils of wire, F, is mounted on a stand, $f$, in a plane between the rolls of lap E and E'. The lap from the lower roll, E', is first drawn through vat A and laid evenly on the lower web, D'. The wires are then drawn from the coils, passed through holes in the guide-plate $f'$, then over the lap E', on which they are laid equidistant from and parallel to each other. The upper lap, E, is now drawn over and evenly laid on the wires. The upper web, D, is then lowered until it rests on the upper lap, and is held there by the upper rollers, which are placed in position as shown. The axles of the lower rolls project through stuffing-boxes in one side of the vat, and are all geared to be revolved together in the same direction by a belt or any suitable well-known connections. The vat is now filled with hot tar or the like; and as soon as the laps already in place are sufficiently saturated the rolls are made to revolve, thereby drawing in the continuous laps and the wires placed between them. The first rolls are smooth, and as they are adjusted more or less closely, according to the viscidity of the tar about the opening in the vat, they, together with the partially-compressed laps, prevent any excessive leakage. The other rolls are provided with properly-spaced grooves gradually increasing in depth. The last pair of rollers are above the tar, and are held together by weights or springs with sufficient force to squeeze out the surplus tar. From these rolls the laps and wires emerge cemented together, as shown at H in Fig. 2, containing about ten insulated wires for every foot in width of the laps, and may be collected in rolls of any desired size. Sixty or seventy yards in length make a convenient roll for handling. In this shape my improved conductors are admirably adapted for underground use, and can be readily laid by simply spreading the roll flat in a properly-prepared trench or box, or by rolling the flat band edgewise to a cylindrical form and secured at proper intervals. This covering not only provides insulation, but also effectually protects the wires from the air and moisture.

It is often desirable to have single insulated wires both for overhead and underground use, and for this reason I pass the laps and their inclosed wires, as they come from the squeeze-rolls, between the revolving knives I I', (see Fig. 2,) and cut them in strips $h$, of equal width, each strip containing one wire, as shown in Fig. 3. By keeping the knives wet with water the tarred cotton is readily cut. These strips are then passed through a steam-heated revolving former, K, by which the tar is softened, and the wings or ribs are folded around and cemented to the covering over the wire, and made round by being drawn through the cylindrical part *k* of the revolving former K. A remarkable strength is imparted to unspun cotton by saturating it with tar or the like, and my improved covering will resist all the strains and wear to which overhead wires are liable better than any covering that I am acquainted with.

I am aware of English Patent No. 2,707 of 1857, which shows a bat or fleece of raw cotton laid on a wire coated with an insulating material while this insulating material is still soft, and an outer coating of insulating material applied to the cotton-bat so laid on. I am also aware of English Patent No. 1,751 of 1866, which shows a number of parallel wires covered with envelopes of textile material; but I believe that I am the first to inclose one or more wires between two laps of raw cotton by passing the wire and both the laps between rollers immersed in the insulating material and compressing and drying the fabric, as hereinbefore set forth.

I claim as my invention—

The insulated electrical conductor above described, consisting of one or more wires between two laps of raw cotton the fibers of which are cemented together by tar or the like.

THOMAS H. DUNHAM.

Witnesses:
 WM. A. COPELAND,
 JOHN R. SNOW.